United States Patent [19]

Wareham

[11] Patent Number: 5,440,932
[45] Date of Patent: Aug. 15, 1995

[54] PRESSURE TRANSDUCER INCLUDING COAXIAL RINGS

[75] Inventor: William Wareham, Marion, Mass.
[73] Assignee: Dynisco, Inc., Sharon, Mass.
[21] Appl. No.: 217,645
[22] Filed: Mar. 24, 1994

Related U.S. Application Data

[62] Division of Ser. No. 632, Jan. 5, 1993, Pat. No. 5,360,331.

[51] Int. Cl.$^6$ .............................................. G01L 7/02
[52] U.S. Cl. ................................ 73/730; 250/227.21; 73/705
[58] Field of Search ............... 425/149; 73/705, 708, 73/729.1, 729.2, 753, 730; 250/227.21, 231.19

[56] References Cited

U.S. PATENT DOCUMENTS

| | | | |
|---|---|---|---|
| 3,014,368 | 12/1961 | Musser et al. | 73/753 X |
| 3,128,628 | 4/1964 | Lebow | 73/726 |
| 3,149,492 | 9/1964 | Weinberg | 73/730 X |
| 3,698,248 | 10/1972 | Vasek | 73/726 |
| 3,698,249 | 10/1972 | Weaver. | |
| 3,750,475 | 8/1973 | Weaver. | |
| 3,767,339 | 10/1973 | Hunkar | 425/149 X |
| 4,030,177 | 6/1977 | Hold | 425/149 X |
| 4,102,210 | 7/1978 | Couston et al. | 73/727 |
| 4,109,147 | 8/1978 | Heske | 250/231.19 |
| 4,218,926 | 8/1980 | DeVisser | 73/730 |
| 4,262,529 | 4/1981 | Rosenblatt et al. | 73/730 X |
| 4,391,147 | 7/1983 | Krempl et al. | 73/730 |
| 4,404,854 | 9/1983 | Krempl et al. | 73/730 |
| 4,429,570 | 2/1984 | Tinder | 73/730 X |
| 4,576,049 | 3/1986 | Kohnlechner | 73/727 X |
| 4,699,004 | 10/1987 | Evans et al. | 73/178 R X |
| 4,706,501 | 11/1987 | Atkinson et al. | 73/730 |
| 4,763,527 | 8/1988 | Raftis | 73/730 |
| 4,807,477 | 2/1989 | Myers et al. | 73/708 |
| 4,807,479 | 2/1989 | Sako et al. | 73/730 |
| 4,835,717 | 5/1989 | Michel et al. | 73/708 X |
| 4,840,068 | 6/1989 | Mayhew, Jr. | 73/730 |
| 4,884,452 | 12/1989 | Kaiser | 73/730 |
| 4,925,619 | 5/1990 | Sparrow et al. | 73/730 X |
| 4,932,263 | 6/1990 | Wlodarczyk | 73/708 X |
| 4,938,068 | 7/1990 | Clements | 73/729 X |
| 4,961,696 | 10/1990 | Yamamura | 425/149 |
| 4,982,607 | 1/1991 | Betterton et al. | 73/725 |
| 5,022,271 | 6/1991 | Hannon, Jr. | 73/730 |
| 5,024,099 | 6/1991 | Lee | 73/730 |
| 5,031,460 | 7/1991 | Kanenobu et al. | 73/730 |
| 5,042,307 | 8/1991 | Kato | 73/708 |
| 5,138,155 | 8/1992 | Gray | 73/705 X |

FOREIGN PATENT DOCUMENTS

WO91/07645  5/1991  WIPO.

Primary Examiner—Richard E. Chilcot, Jr.
Assistant Examiner—Joseph L. Felber
Attorney, Agent, or Firm—Wolf, Greenfield & Sacks

[57] ABSTRACT

A pressure transducer for an injection molding machine includes a housing coupled to a nozzle of an injection molding machine. A hollow stress tube, attached to the housing, through which molten material of the injection molding machine flows, bellows in response to pressure from the material. An outer ring having an opening is coupled to the stress tube such that the outer ring expands, causing displacement of the outer ring about the opening, when the stress tube bellows. A displacement sensor is included for determining the displacement of the outer ring about the opening. This displacement is directly proportional to the pressure of the material. In this manner, the pressure transducer determines the pressure of the molten material.

38 Claims, 3 Drawing Sheets

PRESSURE TRANSDUCER INCLUDING COAXIAL RINGS

This application is a division of application Ser. No. 08/000,632 filed on Jan. 5, 1993, now U.S. Pat. No. 5,360,331.

BACKGROUND OF THE INVENTION

1. Field of the Invention

The present invention relates generally to pressure transducers and pertains, more particularly, to pressure transducers for use with injection molding machines.

2. Discussion of Related Art

Injection molding machines are used to manufacture plastic and metal parts. Injection molding machines typically include a reservoir of molten plastic and a nozzle through which the molten plastic is forced at high pressures into a mold. The plastic is thereafter packed and cooled to form the part. In the manufacture of such parts, it is important to precisely determine the pressure of the injected melt to maintain accuracy of the part because the part must be made at a constant pressure. This is so because otherwise the resulting part may include voids, ripples, poor dimensional accuracy or the like.

As such, there is a need for pressure transducer devices which can accurately measure the pressure of molten plastic within injection molding machines. Attaining accuracy in pressure measurements by injection molding machine pressure transducers is difficult because pressures within such injection molding machines may be as high as within the range of 40–50,000 psi and the temperature may be as high as approximately 500° C. In other words, such pressure transducers must be able to accurately measure and withstand pressures within the range of 40–50,000 psi and operate accurately within an environment having temperatures up to approximately 500° C. Additionally, such pressure transducers are faced with the following constraints: 1. the pressure transducer must have low working stresses to avoid metal fatigue cracking under repetative cyclic loading; 2. the pressure transducer, for economic practicality must be physically arranged such that the chamber/nozzle area can easily be integrated within the injection molding machine; and 3. the pressure transducer must not disrupt the plastic flow or have pockets where plastic will remain and eventually degrade and cause staining of the parts as the degraded plastic moves into the flow.

Accordingly, a general object of the present invention is to provide an injection molding machine pressure transducer which can accurately measure pressures of molten plastic within such machines.

A further object of the present invention is to provide an injection molding machine pressure transducer which is easily integratable with existing injection molding machines.

SUMMARY OF THE INVENTION

To accomplish the foregoing and other objects, features and advantages of the present invention, there is provided a pressure transducer for determining pressure of material in an injection molding machine which includes a housing coupled to a nozzle of an injection molding machine. A hollow stress tube, attached to the housing, through which material of the injection molding machine flows, bellows in response to pressure from the material. An open outer ring and is coupled to the stress tube such that the outer ring expands, causing displacement of the outer ring about the opening, when the stress tube bellows. A displacement sensor determines displacement of the outer ring across the opening which displacement is related to the pressure of the material. The pressure transducer also includes a temperature sensor for determining the operating temperature thereof.

In a preferred embodiment of the present invention, the displacement sensor includes an optical arrangement. In such preferred embodiment the housing of the pressure transducer is mechanically retained in a nozzle bore of the injection molding machine.

BRIEF DESCRIPTION OF THE DRAWINGS

Numerous other objects, features and advantages of the invention will now become apparent to those skilled in the art upon a reading of the following detailed description taken in conjunction with the accompanying drawings, in which.

DETAILED DESCRIPTION

In accordance with the present invention there is provided a pressure transducer for use in an injection molding machine. The pressure transducer is secured within a bore of a nozzle of an injection molding machine and includes an inner stress tube ring through which the molten plastic of the injection molding machine flows. An outer ring having an opening is coaxial with the inner stress tube ring and is attached thereto with flexures. The stress tube bellows in response to pressure from the molten plastic and translates this pressure to the outer open ring through the flexures. As pressure is applied to the melt, an opening of the outer ring widens, displacing the outer ring at both sides of the opening, which displacement is determined by the displacement sensor. This displacement is directly proportional to the pressure of the molten plastic and the pressure is determined from the value of the displacement.

Figure 2:
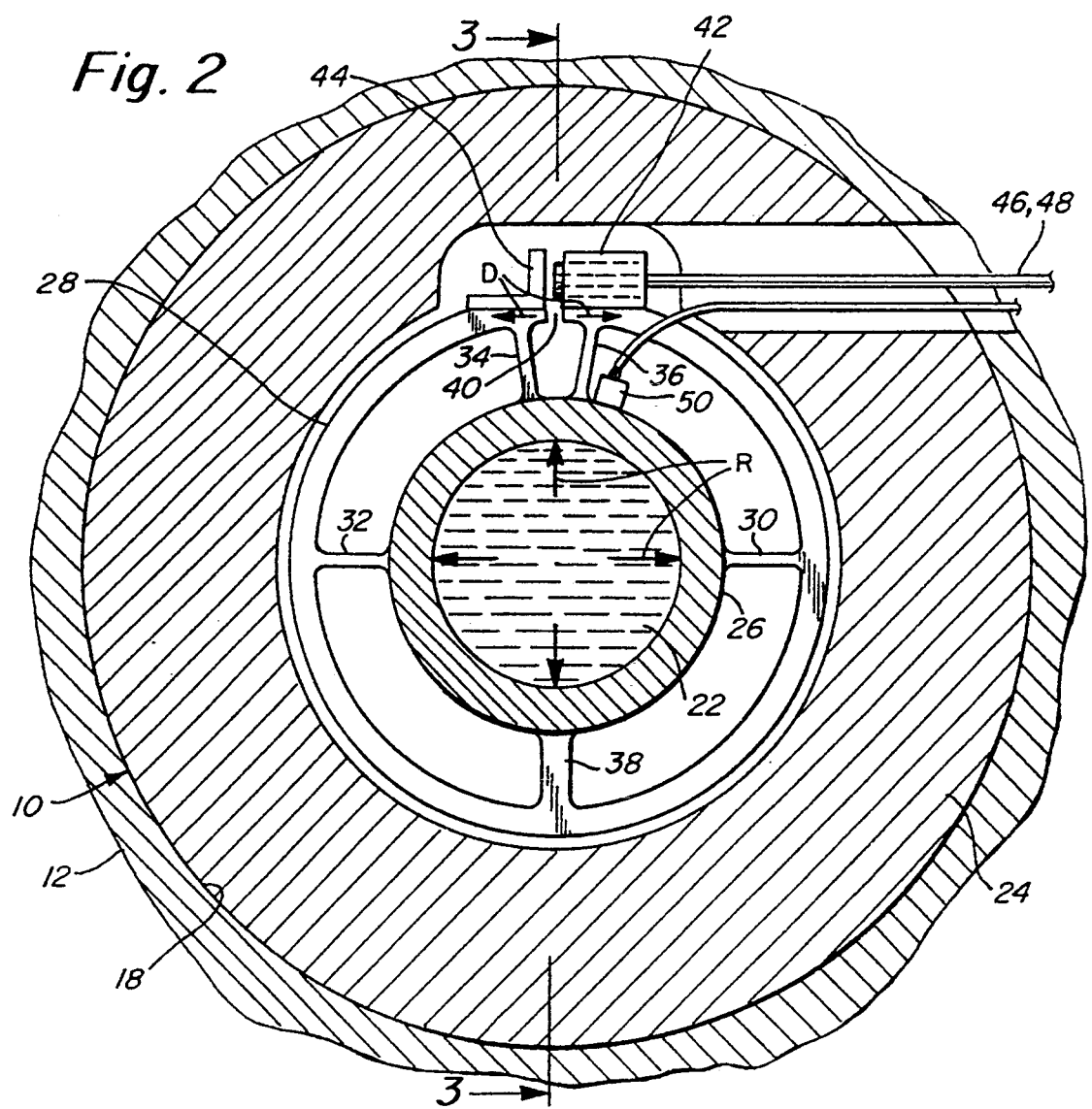
FIG. 2 is a cross-sectional view taken along lines 2—2 of FIG. 1 illustrating components of the pressure transducer.
Figure 3:
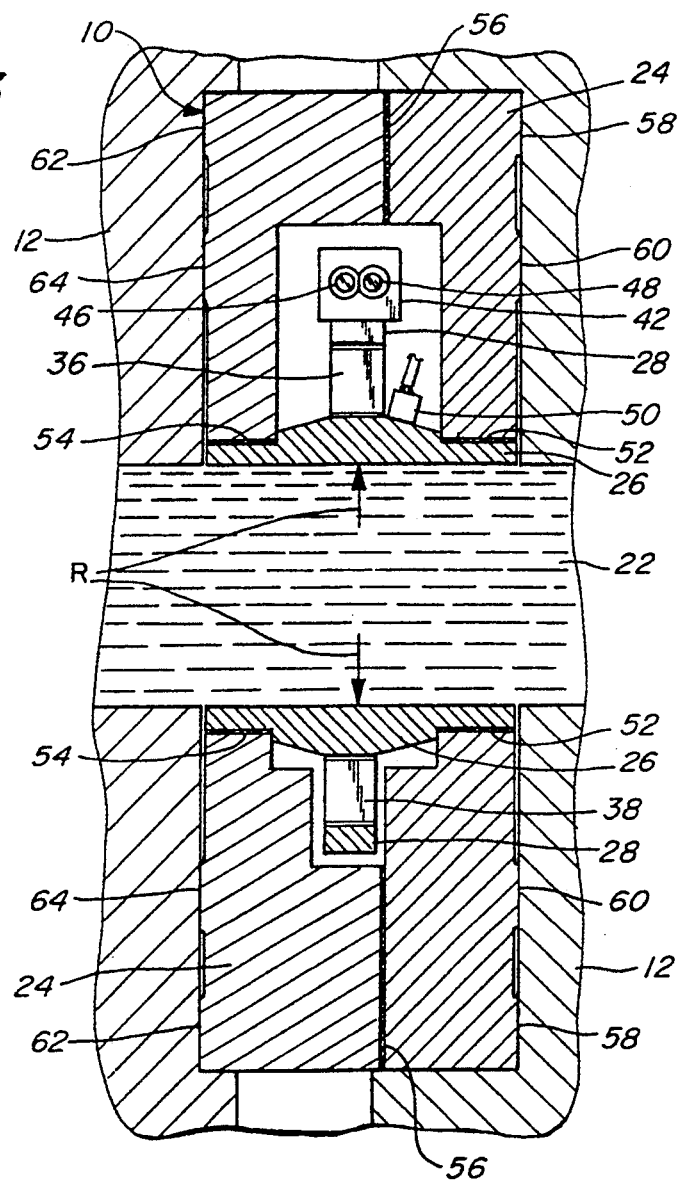
FIG. 3 is a cross-sectional view taken along lines 3—3 of FIG. 2 showing further details of the components of the pressure transducer.
Figure 4:
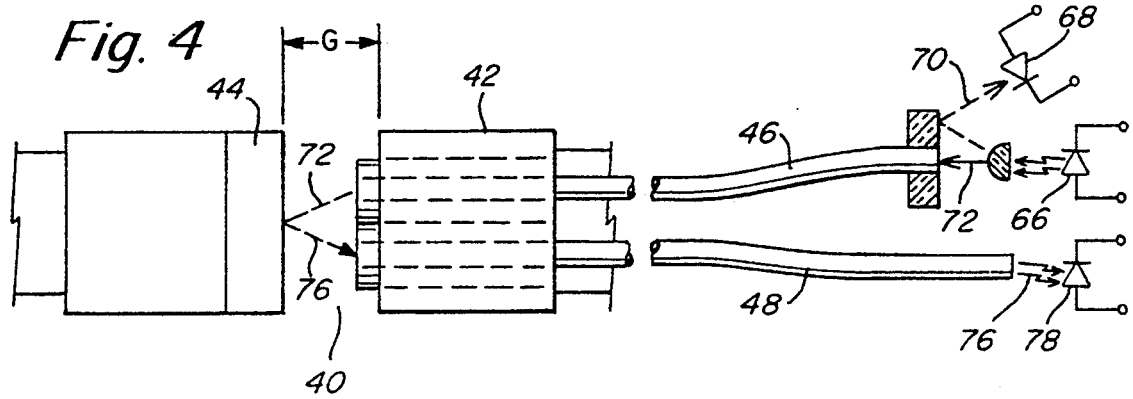
FIG. 4 is a block diagram of the optical arrangement of the displacement sensor of the pressure transducer.
Figure 5:
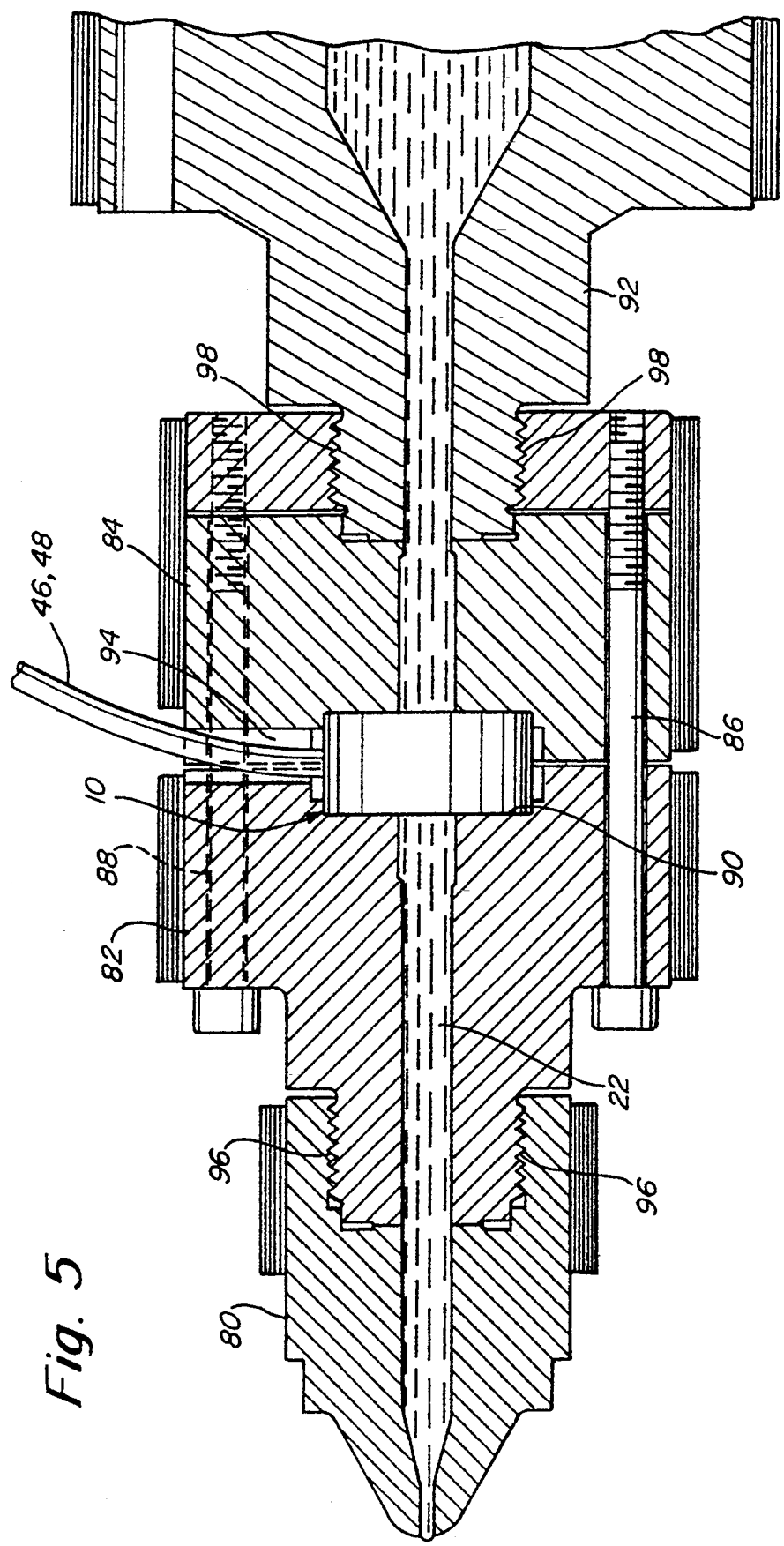
FIG. 5 is a cross-sectional view of an alternate embodiment of the pressure transducer shown mechanically retained within the nozzle of an injection molding machine.

Reference is now made to the drawings and in particular to a first embodiment of the pressure transducer illustrated within a bore of a nozzle of an injection molding machine. FIGS. 2 and 3 illustrate further details of the components of the pressure transducer. FIG. 4 illustrates a preferred optical displacement sensor arrangement. FIG. 5 shows an alternate embodiment of the pressure transducer within a nozzle of an injection molding machine.

Figure 1:
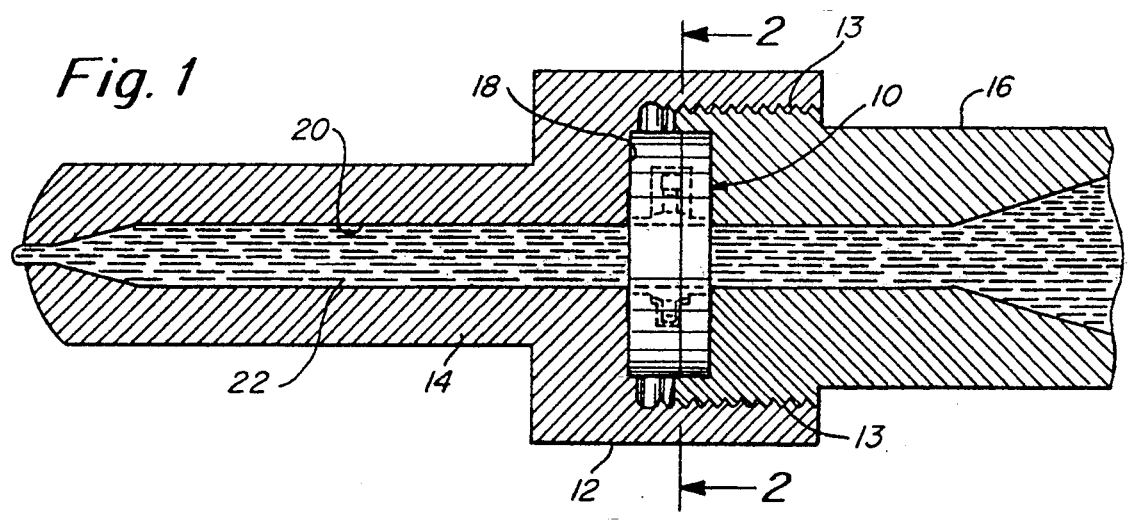
FIG. 1 is a cross-sectional view of the pressure transducer of the present invention retained within the nozzle of an injection molding machine.

FIG. 1 illustrates the pressure transducer 10 retained within the bore 18 of nozzle 12 of an injection molding machine. The pressure transducer 10 is mechanically retained with the bore 18 between outer nozzle piece 14 and inner nozzle piece 16 of nozzle 12 of the injection molding machine. The outer nozzle piece 14 and inner nozzle piece 16 include interengaging threads 13 such that inner nozzle piece 16 can be screwed into outer nozzle piece 14 and sealed therein. Molten plastic 22 flows through canal 20 of the injection molding machine. Pressure transducer 10 is concentric about canal 20 and the molten plastic 22 flows through pressure transducer 10. The pressure transducer 10 measures the pressure of the molten plastic 22.

Pressure transducer 10 is shown in cross-section in FIG. 2. As shown, pressure transducer 10 includes a housing 24, an inner stress tube 26, through which the molten plastic 22 flows, and an outer open ring 28 coaxial and concentric with inner stress tube 26. Outer open ring 28 is connected to inner stress tube 26 through flexures 30, 32, 34, 36, and 38. Flexure 38 is an anchor support flexure which is thicker than the other flexure members and is located diametrically opposite opening 40.

During operation, the inner stress tube ring 26 deflects radially (shown by the arrows R) in response to pressure from molten plastic 22. This radial deflection or bellowing is translated to the outer open ring 28 by the flexures 30, 32, 34, 36 and 38. An opening 40 is included in outer open ring 28. When the outer ring radially displaces in response to translation of the stress tube displacement through the flexures, the opening widens and displacement occurs at the outer open ring equally on both sides of the opening (as illustrated by arrows D). Anchor flexure 38 acts as a fulcrum upon which the outer ring opens. Because the outer open ring encircles the inner stress tube, it mirrors its radial displacement through the flexures. Because the outer ring is open, however, circumferential displacement of the outer ring is concentrated at the opening and is amplified by approximately $2\pi$ times the radial displacement of the stress tube. This open ring arrangement, which causes the amplification of radial expansion, provides advantages in the area of accuracy and longevity of the pressure transducer, as will be described in greater detail hereinafter.

The pressure of the molten plastic is directly proportional to the radial expansion of the inner stress tube. Displacement of the outer open ring at both sides of the opening 40 is directly proportional to the radial expansion of the inner stress tube. Displacement sensor 42 is attached to outer open ring at one side of the opening and mirrored bracket 44 is attached to the outer open ring at the other side of the opening. Displacement sensor 42 determines the amount of the opening of the outer open ring 28 at character 40. From this displacement value, the transducer determines the pressure sensed. Optical fibers 46 and 48, along with mirror 44, are combined to create a displacement sensor 42, the operation of which will be described hereinafter. Temperature sensor 50 is provided at the surface of the stress tube 26 to determine the operating temperature of the transducer and to provide a temperature compensation at a pressure of zero.

Flexures 30-38 translate the radial expansion from the stress tube 26 to the outer ring 28. It is important that the flexures be axially rigid to translate the expansion with minimum deflection. In addition, it is important that the flexures be circumferentially or laterally flexible allowing the opening 40 to widen. The inner stress tube radial expansion is magnified at the opening 40 by approximately $2\pi$. For a stress tube radial deflection of 0.0008 inches, a gap opening of approximately 0.005 inches occurs.

Further details of the pressure transducer 10 are illustrated in cross-section in FIG. 3. As illustrated, the inner stress tube ring 26 is attached to transducer housing 24 through copper brazes 52 and 54. The transducer housing 24 includes two pieces which are attached together by copper braze 56. The housing body is preferably made from stainless steel and is designed such that the transducer can withstand high pressure from the nozzle. Contoured feet 58, 60, 62 and 64 are provided in transducer housing 24 to aid in the mechanical retention and sealing within the bore to the nozzle 12. The contoured feet provide a metal to metal seal and also provide mechanical rigidity. As shown, inner stress tube ring 26 directly contacts molten plastic 22 which provides pressure thereto.

Pressure transducer 10 is heat sensitive. Therefore, temperature sensor 50 is used to sense the temperature thereat and a feedback arrangement (not shown) is used to provide electronic thermal zero compensation to alter the characteristics of the transducer based on temperature changes sensed by sensor 50. Accordingly, zero shift temperature characteristic information is determined for the transducer and used in the temperature feedback and compensation circuitry. Additionally, the transducer is calibrated during initial tests when known accurate pressures are applied to the transducer and the displacement of the opening is thereafter measured. Relationships are determined for pressures and displacement levels, such that the transducer can compute pressure values based upon particular displacement.

The design of the transducer is fundamentally simple which offers certain advantages. For example, the stress tube, flexures and outer ring can be machined from a single piece of metal or separate pieces and then copper brazed and/or welded together to complete the mechanical assembly. The maximum pressure capability of the transducer is approximately 50,000 psi. Because the inner stress tube is stiff and includes the motion-amplified outer ring coaxial therewith, the transducer itself provides low stress with ample deflection which aids in the longevity of the transducer. In the arrangement shown in FIG. 1, no drilled holes are provided which penetrate the bore. Therefore, the bore remains clean so as to not alter any pressure characteristics of the injection molding machine. In addition, because the pressure transducer is located at the nozzle of the injection molding machine, the pressure is determined at the point just before the molten plastic is injected into the mold which is desired.

FIG. 4 is a block diagram illustrating a preferred arrangement of the displacement sensor 42. This arrangement is an optical fotonic arrangement including an input optical fiber 46 and an output optical fiber 48. An LED 66, or light source, generates light, a small portion 70 of which is reflected to the photodetector 68. A majority of the remainder of the light produced is inputted into the input optical fiber 46 as an input light ray 72. The light produced by LED 66 is input through lens 71 which focuses the light. Photodetector 68 determines the level of the reflected ray 70, the desired level of which is predetermined. A feedback arrangement (not shown) is provided between photodetector 68 and LED 66 such that if the intensity of the reflected ray 70 lessens, more power is provided to LED 66 to compensate for the decrease in light output. Input ray 72 runs through input optical fiber 46 and reflects off of mirrored bracket 44. The incident light intensity is dependent upon the gap G or the displacement of the outer open ring about the opening 40. A portion 76 of the reflected ray is outputted into output optical fiber 48 and is detected by photodetector 78. The level of the reflected ray 76 is directly proportional to the displacement of the outer open ring about the opening 40. In this manner, the displacement is determined.

While this preferred embodiment of the displacement sensor includes an optical arrangement, it will be appreciated by those skilled in the art that a displacement sensor could include an interferometric laser arrangement, a capacitance device, an inductive device (such as a linear variable differential transformer (LVDT)), or the like. Each of these devices would determine the displacement about the opening of the outer open ring.

FIG. 5 illustrates an alternate embodiment of the present invention in which the pressure transducer 10 is mechanically retained between two nozzle flanges 82 and 84 of the nozzle of an injection molding machine.

In this embodiment nozzle flanges 82 and 84 are attached to one another with bolts 86 and 88. Bore 90 between the two flanges 82 an 84 is machined for housing the transducer 10. The optical fibers 46 and 48 are fed through an opening 94. The nozzle additionally includes nozzle tip 80 and adapter 92. Nozzle flange 82 is attached to nozzle tip 80 by screw threads 96. It should be appreciated to those skilled in the art that this attachment could be attained by other means. Nozzle flange 84 is attached to nozzle component 92 by screw threads 98. This embodiment provides the advantage that the nozzle pieces including nozzle tip 80, nozzle flanges 82 and 84, and adapter 92 are all modular and fit together such that the transducer 10 is secured therein.

One distinct advantage offered by both embodiments (shown in FIGS. 1 and 5) of the present invention is that the pressure transducer 10 fits within existing injection molding machines by simply providing a bore between two attaching pieces of the nozzle thereof. An alternate embodiment, not shown in the drawings, includes generating an adapter to a nozzle of an injection molding machine which may be threaded or otherwise attached between an existing nozzle and an injection molding barrel. The adapter includes the pressure transducer of the present invention therein. This adapter may be manufactured from the same single piece of metal from which the pressure transducer housing is manufactured or, alternatively, the pressure transducer may be retained within the adapter through mechanical retention or the like.

While the present invention has been described in connection with an injection molding machine, other applications are envisioned for the pressure transducer, including, but not limited to, the following:

1. The pressure transducer could replace melt transducers in extrusion applications;
2. The pressure transducer could be used to determine the rheological properties of a polymer melt or other viscous or visco-elastic fluid.
3. The pressure transducer could be used in processing plants in piping, etc.; or
4. The pressure transducer could be installed within a hot runner manifold attached to injection molds.

Having now described a limited number of embodiments of the invention, it should now be apparent to those skilled in the art that numerous other embodiments and modifications thereof are contemplated as falling within the scope of the present invention as defined by the appended claims and their equivalents.

What is claimed is:

1. A pressure transducer for an injection molding machine, comprising:
    a housing coupled to a nozzle of the injection molding machine;
    a hollow stress tube, attached to the housing, through which molten material of the injection molding machine flows, the stress tube bellowing in response to pressure from the material;
    an outer ring, located coaxially of the stress tube and having only a single gap, coupled to the stress tube through at least one flexure member such that the outer ring expands, causing displacement of the outer ring about the gap, when the stress tube bellows; and
    means for determining the displacement of the outer ring about the gap.

2. A transducer for measuring the pressure of a flowing material, the transducer comprising:
    a hollow stress tube disposed such that the material flows through the stress tube, the stress tube expanding in response to pressure exerted thereon by the flowing material;
    an outer member disposed about the hollow stress tube, the outer member extending substantially continuously along a path about the stress tube except for a single gap defined in the outer member;
    means for intercoupling the hollow stress tube and the outer member so as to impart any expansion of the stress tube to the outer member, wherein the means for intercoupling includes at least one flexure member connected between the hollow stress tube and the outer member; and
    means for sensing expansion imparted to the outer member.

3. A transducer as claimed in claim 2 further including a housing, coupled to the hollow stress tube, for encasing the stress tube, the outer member, the intercoupling means and the sensing means.

4. A transducer as claimed in claim 2 further including a housing coupled to a nozzle of an injection molding machine.

5. A transducer as claimed in claimed 2 wherein the outer member includes a gap such that the outer member is displaced about the gap when pressure is imparted to the outer member.

6. A transducer as claimed in claim 5 wherein the sensing means includes an optical arrangement, coupled to the outer member, for determining displacement about the gap.

7. A transducer as claimed in claim 6 wherein the optical arrangement includes a mirrored bracket attached to the outer member on one side of the gap and a displacement sensor attached to the outer member on the other side of the gap.

8. A transducers as claimed in claim 5 wherein the at least one flexure member includes first and second flexure members attached to the outer member, each flexure member disposed on an opposite side of the gap.

9. A transducer as claimed in claim 2 wherein the sensing means includes an optical arrangement coupled to the outer member.

10. A transducer as claimed in claim 2 further including means for determining temperature of the transducer.

11. A transducer as claimed in claim 2 wherein the outer member is disposed about the periphery of the stress tube.

12. A transducer as claimed in claim 2 wherein the outer member is substantially ring-shaped.

13. A transducer as claimed in claim 12 wherein the outer member includes an opening such that the outer member is displaced about the opening when pressure is imparted to the outer member.

14. A pressure transducer comprising:
a hollow stress tube through which material flows, the stress tube expanding and contracting in response to pressure variations exerted thereon by the material;
an outer member disposed about the hollow stress tube and including a gap;
means for intercoupling the hollow stress tube and the outer member so as to impart any expansion of the stress tube to the outer member, the means for intercoupling including a plurality of flexure members, wherein one of the flexure members is located substantially diametrically opposite to the gap; and
means for sensing expansion imparted to the outer member.

15. A transducer as claimed in claim 14 further including a housing, coupled to the hollow stress tube, for encasing the stress tube, the outer member, the intercoupling means and the sensing means.

16. A transducer as claimed in claim 15 wherein the housing is coupled to a nozzle of an injection molding machine.

17. A transducer as claimed in claim 14 wherein the outer member includes a gap such that the outer member is displaced about the gap when pressure is imparted to the outer member.

18. A transducer as claimed in claim 17 wherein the sensing means includes an optical arrangement, coupled to the outer member, for determining displacement about the gap.

19. A transducer as claimed in claim 18 wherein the optical arrangement includes a mirrored bracket displacement sensor attached to the outer member on the one side of the gap.

20. A transducer as claimed in claim 17 wherein the plurality of flexure members includes first and second flexure members attached to the outer member, each flexure member disposed on an opposite side of the gap.

21. A transducer as claimed in claim 14 wherein the sensing means includes an optical arrangement coupled to the outer member.

22. A transducer as claimed in claim 14 further including means for determining temperature of the transducer.

23. A transducer as claimed in claim 14 wherein the outer member is disposed about the periphery of the stress tube.

24. A transducer as claimed in claim 14 wherein the outer member is substantially ring-shaped.

25. A transducer as claimed in claim 24 wherein the outer member includes an opening such that the outer member is displaced about the opening when pressure is imparted to the outer member.

26. A method of constructing a pressure transducer comprising the steps of:
providing a hollow stress tube which expands and contracts substantially evenly along its entire circumference in response to pressure variations exerted thereon;
disposing an outer member about the hollow stress tube;
intercoupling the hollow stress tube and the outer member with at least one flexure member so as to impart any expansion of the stress tube to the outer member, wherein the at least one flexure member includes an anchor flexure member disposed diametrically opposite a single opening in the outer member; and
providing a sensing means for sensing expansion imparted to the outer member.

27. A method as claimed in claim 26 further including the step of encasing the pressure transducer in a housing.

28. A method as claimed in claim 26 wherein the step of disposing an outer member includes the step of disposing an outer member having an opening therein, wherein the outer member is displaced about the opening when pressure is imparted to the outer member.

29. A pressure transducer for an injection molding machine, comprising:
a housing coupled to a nozzle of the injection molding machine;
a hollow stress tube, attached to the housing, through which molten material of the injection molding machine flows, the stress tube bellowing in response to pressure from the material;
an outer ring, extending substantially continuously along a path about the stress tube except for a single gap defined in the outer ring, coupled to the stress tube through at least one flexure member such that the outer ring expands, causing displacement of the outer ring about the gap, when the stress tube bellows; and
means for determining the displacement of the outer ring about the gap.

30. A pressure transducer as claimed in claim 29 wherein the at least one flexure member includes an anchor flexure member disposed substantially diametrically opposite the gap.

31. A pressure transducer as claimed in claim 30 wherein the at least one flexure member further includes a plurality of flexure members extending radially and circumferentially from the hollow stress tube, the flexure members varying in thickness such that the thicknesses of the flexure members decrease from the anchor flexure member toward the gap.

32. A transducer for measuring the pressure of a material comprising:
a hollow stress tube disposed such that the material flows through the stress tube, the stress tube expanding in response to pressure exerted thereon by the material;
an outer member disposed substantially coaxially about the hollow stress tube and including only a single gap;
a plurality of flexure members intercoupling the hollow stress tube and the outer member so as to impart any expansion of the stress tube to the outer member; and
means for sensing expansion imparted to the outer member.

33. A transducer as claimed in claim 31 wherein the plurality of flexure members includes an anchor flexure member disposed substantially diametrically opposite the gap.

34. A transducer as claimed in claim 33 wherein the plurality of flexure members extend radially out from the hollow stress tube, the flexure members varying in thickness such that the thicknesses of the flexure members decrease from the anchor flexure toward the gap.

35. A pressure transducer comprising:
 a hollow stress tube through which material flows, the stress tube expanding and contracting substantially evenly along its entire circumference in response to pressure variations exerted thereon by the material;
 an outer member disposed about the hollow stress tube and including a only single gap;
 a plurality of flexure members intercoupling the hollow stress tube and the outer member for imparting any expansion of the hollow stress tube to the outer member; and
 means for sensing expansion imparted to the outer member.

36. A pressure transducer as claimed in claim 35 wherein the plurality of flexure members includes an anchor flexure member disposed substantially diametrically opposite the gap.

37. A pressure transducer as claimed in claim 36 wherein the plurality of flexure members further includes a pair of flexure members disposed adjacent the gap and disposed symmetrically on opposite sides of the gap.

38. A pressure transducer as claimed in claim 37 wherein the plurality of flexure members extend radially out from the hollow stress tube, the flexure members varying in thickness such that the thicknesses of the flexure members decrease from the anchor flexure toward the gap.

* * * * *